(12) United States Patent
Miyahara

(10) Patent No.: US 6,795,765 B2
(45) Date of Patent: Sep. 21, 2004

(54) TRACKING OF A TARGET VEHICLE USING ADAPTIVE CRUISE CONTROL

(75) Inventor: Shunji Miyahara, Yokohama (JP)

(73) Assignee: Visteon Global Technologies, Inc., Dearborn, MI (US)

(*) Notice: Subject to any disclaimer, the term of this patent is extended or adjusted under 35 U.S.C. 154(b) by 179 days.

(21) Appl. No.: 09/815,187

(22) Filed: Mar. 22, 2001

(65) Prior Publication Data

US 2002/0138193 A1 Sep. 26, 2002

(51) Int. Cl.[7] ............................................. G06F 15/50
(52) U.S. Cl. ........................... 701/96; 342/29; 342/109; 340/902; 340/441; 340/465; 180/170
(58) Field of Search ..................... 342/29, 104, 109, 342/70; 701/96, 301, 93, 205, 300; 340/902, 903, 435, 436, 444, 441, 465, 467; 180/170, 282, 169, 168, 167, 271

(56) References Cited

U.S. PATENT DOCUMENTS

| | | | |
|---|---|---|---|
| 5,388,048 A | 2/1995 | Yavnayi et al. ............. 180/170 |
| 5,467,283 A | * 11/1995 | Butsuen et al. ............. 340/903 |
| 5,479,173 A | 12/1995 | Yoshioka et al. ............. 342/70 |
| 5,572,428 A | 11/1996 | Ishida et al. ................ 180/170 |
| 5,585,798 A | 12/1996 | Yoshioka et al. ............. 342/70 |
| 5,594,645 A | 1/1997 | Nishimura et al. ......... 180/170 |
| 5,648,905 A | * 7/1997 | Izumi et al. ................ 340/903 |
| 5,680,097 A | * 10/1997 | Uemura et al. ............. 340/435 |
| 5,708,584 A | * 1/1998 | Doi et al. .................... 180/170 |
| 5,745,070 A | 4/1998 | Yamada ....................... 342/70 |
| 5,745,870 A | 4/1998 | Yamamoto et al. ......... 701/301 |
| 5,761,629 A | * 6/1998 | Gilling ......................... 701/96 |
| 5,786,787 A | 7/1998 | Eriksson et al. .............. 342/70 |
| 5,926,126 A | * 7/1999 | Engelman ..................... 342/70 |
| 5,955,967 A | 9/1999 | Yamada ....................... 340/904 |
| 5,959,569 A | * 9/1999 | Khodabhai ................... 342/70 |
| 5,964,822 A | * 10/1999 | Alland et al. ................ 701/301 |
| 6,025,797 A | 2/2000 | Kawai et al. ................. 342/70 |
| 6,026,347 A | 2/2000 | Schuster ...................... 701/301 |
| 6,035,053 A | 3/2000 | Yoshioka et al. ........... 382/104 |
| 6,081,762 A | * 6/2000 | Richardson et al. ......... 701/93 |
| 6,085,151 A | 7/2000 | Farmer et al. .............. 701/301 |
| 6,087,995 A | 7/2000 | Grace et al. ................ 343/703 |
| 6,094,616 A | 7/2000 | Andreas et al. .............. 701/96 |
| RE36,819 E | 8/2000 | Gellner et al. ................ 342/70 |
| 6,140,954 A | 10/2000 | Sugawara et al. ............ 342/70 |
| 6,202,027 B1 | * 3/2001 | Alland et al. ................ 701/301 |
| 6,246,949 B1 | * 6/2001 | Shirai et al. .................. 701/96 |
| 6,292,752 B1 | * 9/2001 | Franke et al. ............... 701/300 |
| 6,438,491 B1 | * 8/2002 | Farmer ....................... 701/301 |
| 2001/0025211 A1 | * 9/2001 | Shirai et al. ................... 701/1 |

FOREIGN PATENT DOCUMENTS

| | | |
|---|---|---|
| JP | 4-245600 | 9/1992 |
| JP | 8-220225 | 8/1996 |

* cited by examiner

*Primary Examiner*—Thomas G. Black
*Assistant Examiner*—Tuan C To
(74) *Attorney, Agent, or Firm*—Brinks Hofer Gilson & Lione

(57) ABSTRACT

An adaptive cruise control system is provided for tracking a target vehicle through a curve. The adaptive cruise control system tests whether the target vehicle is traveling along the curve or whether the target vehicle is changing lanes. The test includes monitoring a change in travel directions between the target vehicle and the adaptive cruise control vehicle. In one embodiment, the test monitors a change relative velocity versus azimuth angle.

22 Claims, 20 Drawing Sheets

Case A $V_R = V_T - V_A = 0$ $\phi = \theta = 0$

Case B

Fig. 3A
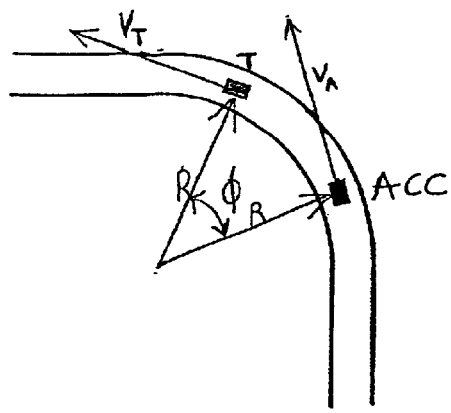
Case C
Fig. 3B
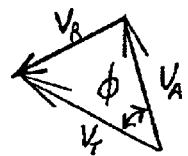
$$V_R = 2V \sin(\phi/2) \quad (V = V_T = V_A)$$
Fig. 3C
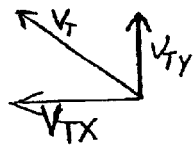 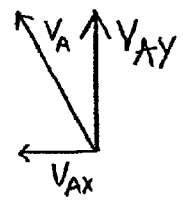
$$V_R = SQRT\left[(V_{TX} - V_{AX})^2 + (V_{TY} - V_{AY})^2\right]$$

Case D

Case E

Trace of Curve

Change in Azimuth Angle Through Curve

Lane Change

Change in Azimuth Angle Through lane Change

Exit

TRACKING OF A TARGET VEHICLE USING ADAPTIVE CRUISE CONTROL

BACKGROUND

The present invention relates generally to automotive vehicles, and more particularly, to a cruise control system.

Cruise control systems are well known in the automotive arts and generally make driving an automotive vehicle easier by automatically adjusting the speed of the vehicle without intervention by the driver. Traditionally, cruise control systems have been designed to maintain a constant speed that is preset by the driver. Thus, in traditional systems, the driver accelerates the vehicle until the vehicle is travelling at the desired speed. The driver then initiates the cruise control by pushing the cruise control button on the steering column or dashboard. Once engaged, the cruise control continuously monitors the speed of the driver's vehicle and automatically adjusts the speed in order to maintain the preset speed.

While traditional cruise control systems have been widely accepted by automotive drivers, several disadvantages exist. Traditional cruise control systems are generally ineffective when a moderate amount of traffic exists on a roadway. In these situations, the speed of the surrounding vehicles fluctuates more often and with greater variation. Moderate traffic levels also provide less room for the driver to avoid slower and faster moving vehicles. In moderate traffic the driver must adjust the vehicle speed manually without using the cruise control since it is often difficult or impossible to maintain a constant speed.

Another disadvantage arises when a driver wishes to maintain a certain distance with another vehicle. This often occurs when a group of people are travelling together in two or more vehicles. In this situation, the lead vehicle may use a cruise control system to maintain a constant speed. However, the other vehicles encounter difficulties attempting to use traditional cruise control systems to follow the lead vehicle. Traditional cruise control systems usually do not provide precise enough selection of the preset speed to allow one vehicle to match the speed of another vehicle. Another problem is that following drivers are usually unable to visually perceive the exact speed of the lead vehicle. Thus, when drivers try to use traditional cruise control systems to follow a lead vehicle, the following vehicle usually slowly encroaches upon or slowly falls further behind the lead vehicle. As a result, the driver is required to regularly adjust the preset speed of the cruise control system or may choose to manually control the vehicle speed. Following a lead vehicle can also be difficult when the lead vehicle is not using a cruise control system to maintain a constant speed.

Adaptive cruise control ("ACC") systems may eliminate these problems by allowing a driver to maintain the same speed as a target vehicle. Accordingly, a driver in a vehicle equipped with ACC ("the ACC vehicle") typically maneuvers the ACC vehicle behind a lead vehicle ("the target vehicle") and engages the ACC system. The ACC then tracks the target vehicle and automatically adjusts the speed of the ACC vehicle in order to maintain the distance between the ACC vehicle and the target vehicle.

One problem with current ACC systems is that the ACC usually has trouble tracking the target vehicle along curves in the road. Typically, ACC systems are designed to travel at the preset speed when no target vehicle exists directly ahead of the ACC vehicle. This is often called CC mode (Conventional Cruise Control), while the tracking function is called ACC mode. An ACC will change from the ACC mode to the CC mode when the target vehicle changes lanes out of the lane of the ACC vehicle. When the ACC disengages, the cruise control system typically selects a preset speed chosen either by the manufacturer or the driver and maintains the speed of the vehicle at the preset speed. Therefore, when the target vehicle changes lanes away from the ACC vehicle, the ACC disengages and the vehicle maintains a preset speed.

When the target vehicle remains in the same lane as the ACC vehicle and instead enters a curve in the road, the ACC desirably continues tracking the target vehicle and maintaining the same speed as the target vehicle. However, there are no effective methods to distinguish between the cases of a lane change and curve travel by the target vehicle. Usually, current ACCs determine that the preceding vehicle has changed lanes. After the ACC vehicle enters the curve, the ACC then determines that the preceding vehicle is a target. Namely, the mode of the ACC switches as follows: first ACC mode, next CC mode, then ACC mode. Desirably, however, the ACC vehicle should remain in the ACC mode during the entire curve travel.

SUMMARY

The present invention is defined by the following claims, and nothing in this section should be taken as a limitation on those claims. By way of introduction, the embodiments described below include an ACC system for deciding whether a target vehicle is traveling along a curve or whether the target vehicle is changing lanes. The ACC measures an azimuth angle and a relative velocity between the ACC vehicle and the target vehicle. After the target vehicle enters the curve or starts the lane change, the relative velocity and the azimuth angle starts changing. The temporal locus is remarkably different between the two possibilities since the change in velocity and azimuth angle is different for each possibility. When the angle is getting larger than 1.5 degrees, the ACC starts judging whether the preceding vehicle is entering a curve or changing lanes. The judgment can be made by comparing several locus patterns of the preceding vehicle during curve travel and lane changes.

BRIEF DESCRIPTION OF THE DRAWINGS

The invention, including its construction and method of operation, is illustrated diagrammatically in the drawings, in which:

FIG. 3A is a plan view of the ACC vehicle and the target vehicle, showing both vehicles traveling along the curve.

FIG. 3B is a view of the velocity vectors of both vehicles of FIG. 3A, showing the relative velocity between the vehicles;

FIG. 3C is another view of the velocity vectors of both vehicles of FIG. 3A, showing an alternative way to calculate the relative velocity;

DESCRIPTION

Referring now to the figures, an adaptive cruise control ("ACC") system is provided that tracks a target vehicle through a curve, especially at its entrance and exit. Curve travel may generally be described in five different cases. Accordingly, the five cases are shown sequentially in FIGS. 1–5. Throughout the described examples except where noted, the speed of the target vehicle is 108 km/h, and the speed of the ACC vehicle is 108 km/h. The distance between the two vehicles is 120 m. Additionally, the curve extends 90° between the starting point and the ending point. The radius of the curve is 500 m. The described ACC can track the target vehicle in a variety of curves, speeds, distances and circumstances.

Figure 1A:
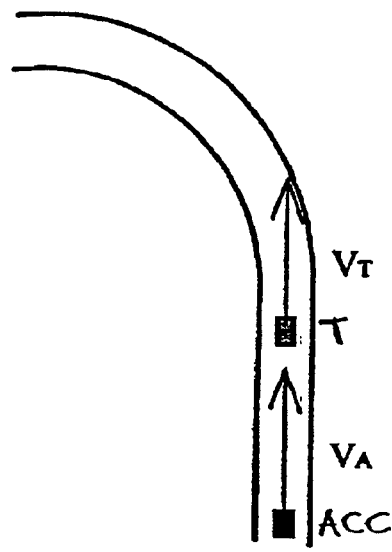
FIG. 1A is a plan view of an ACC vehicle tracking a target vehicle, showing both vehicles traveling on a straight portion of a road before a curve.
Figure 1B:
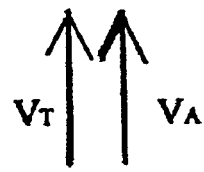
FIG. 1B is a view of the velocity vectors of the ACC vehicle and the target vehicle of FIG. 1A showing zero relative velocity between the vehicles.

In FIG. 1A, Case A of the curve travel is shown. In Case A, both the ACC vehicle ("ACC" in the figures) and the target vehicle ("T" in the figures) are traveling along a straight portion of the road before entering a curve. The velocity of the ACC vehicle is represented by the arrow labeled $V_A$, and the velocity of the target vehicle is labeled $V_T$. In FIG. 1B, the velocity $V_A$ of the ACC vehicle and the velocity $V_T$ of the target vehicle have the same direction and speed. Therefore, the relative velocity $V_R$ between the target vehicle and the ACC vehicle is zero. Likewise, the radial angle $\phi$ and the azimuth angle $\theta$ between the two vehicles are also 0.

Figure 2:
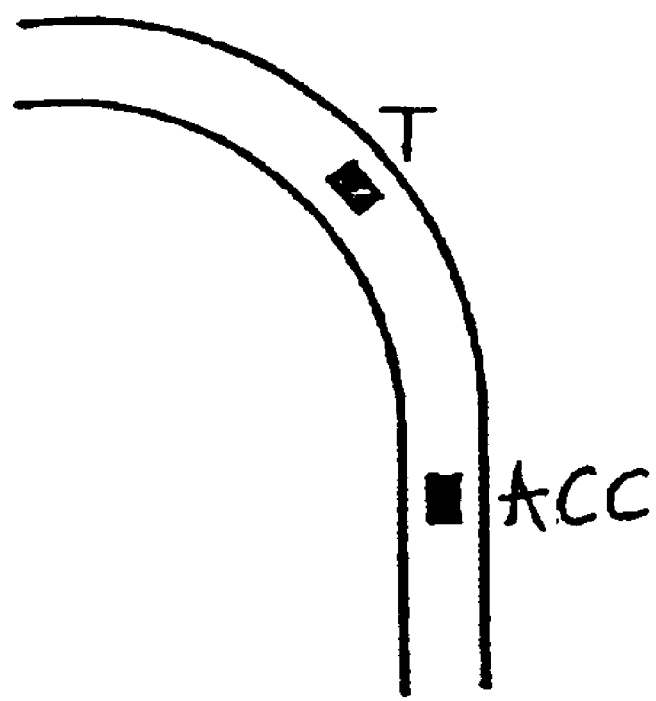
FIG. 2 is a plan view of the ACC vehicle and the target vehicle, showing the target vehicle traveling along the curve and the ACC vehicle traveling along the straight portion before the curve.

Turning now to FIG. 2, Case B is shown. In Case B, the target vehicle has entered the curve. However, the ACC vehicle has not entered the curve and remains on the straight portion of the road before the curve. Since the target vehicle is now traveling along the curve while the ACC vehicle is traveling straight, the velocity direction of the two vehicles is different. Current ACC systems often misinterpret this situation as a lane change, thus disengaging the ACC. However, as described below, the present ACC is able to distinguish Case B from a lane change and continues to track the target vehicle despite the difference in travel direction.

Turning now to FIG. 3A, Case C is shown. In Case C, the ACC vehicle has entered the curve along with the target vehicle. Thus, in the present example where the radius of the curve is constant, both vehicles are traveling along the same radius with the same yaw rates (i.e., lateral movement relative to each vehicle). Accordingly, the radial angle $\phi$ between the ACC vehicle and the target vehicle is calculated to be about 14° ((360*120)/(2*π*500)). The velocity arrows $V_A$ and $V_T$ in FIG. 3A demonstrate the difference in velocity direction between the ACC vehicle and the target vehicle.

In FIG. 3B, the velocity $V_A$ of the ACC vehicle and the velocity $V_T$ of the target vehicle are drawn to show the relative velocity $V_R$ between the two vehicles. Assuming that the magnitude of velocity $V_A$ (i.e., speed) of the ACC vehicle and the magnitude of velocity $V_T$ of the target vehicle are the same, the relative velocity is calculated to be about 26 km/h.

FIG. 3C shows another calculation of the relative velocity. The velocity $V_T$ of the target vehicle is divided into a horizontal component $V_{TX}$ and a vertical component $V_{TY}$. The velocity $V_A$ of the ACC vehicle is also divided into a horizontal component $V_{AX}$ and a vertical component $V_{AY}$. The relative velocity is calculated with the formula $V_R = \text{SQRT}[(V_{TX}-V_{AX})^2 + (V_{TY}-V_{AY})^2]$.

Figure 3D:
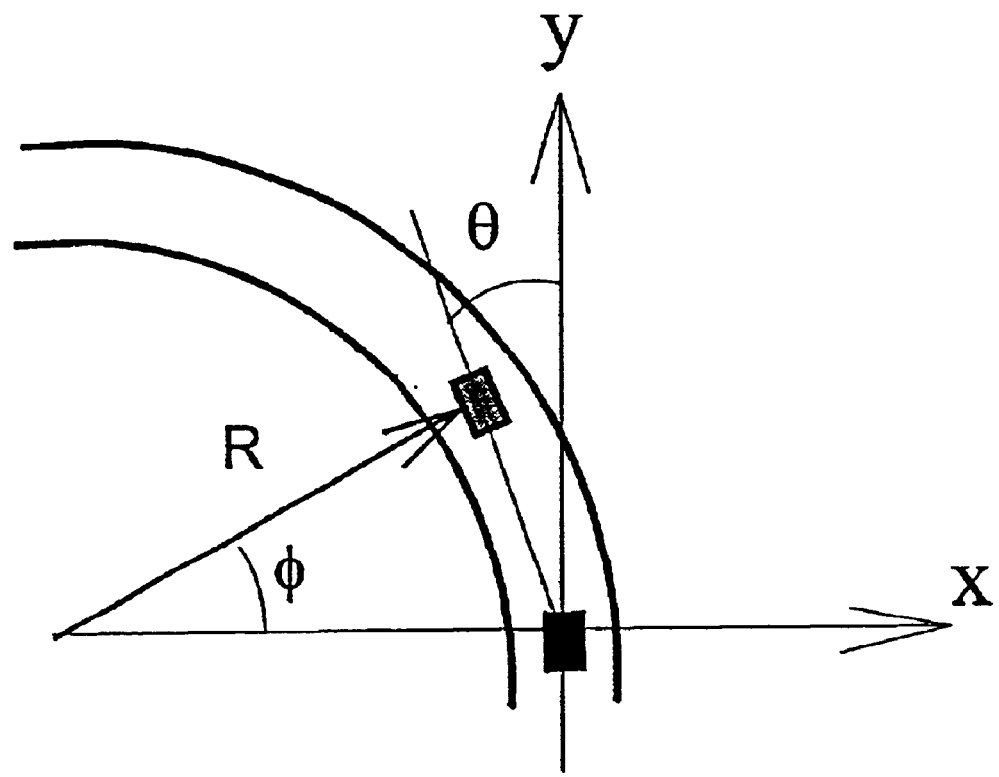
FIG. 3D is a plan view of the ACC vehicle and target vehicle, showing the azimuth angle between the vehicles.

FIG. 3D shows the azimuth angle θ of the target vehicle. The azimuth angle is the angle of the target vehicle from the forward line of sight of the ACC vehicle. The azimuth angle is calculated by first determining the horizontal distance x and the vertical distance y of the target vehicle from the ACC vehicle. Accordingly, the horizontal distance is calculated as $X = R*\text{COS} \phi - R$, and the vertical distance is calculated as $Y = R \text{ SIN} \phi$, where $\phi$ is the radial angle between the vehicles. The azimuth angle is calculated as $\theta = \text{ATAN}(X/Y)$. In the present example, the azimuth angle θ is about 7°. Geometrically, the azimuth angle is one-half of the radial angle for constant radius curves.

The relative velocity and azimuth angle may be calculated in a variety of ways, and the examples above are only intended to generally describe relative velocity and azimuth angle.

Figure 4:
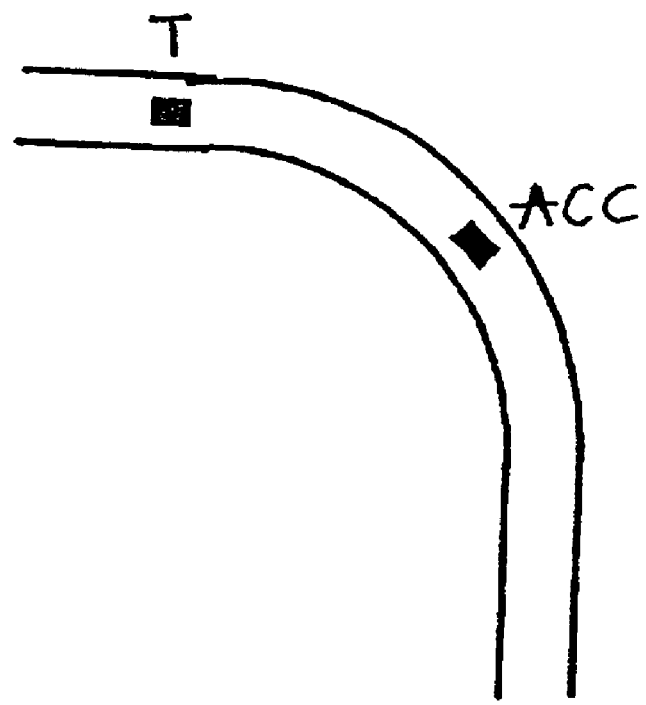
FIG. 4 is a plan view of the ACC vehicle and the target vehicle, showing the target vehicle traveling along a straight portion after the curve and the ACC vehicle traveling along the curve.

Turning now to FIG. 4, Case D is shown. In Case D, the target vehicle has exited the curve and is traveling along a straight portion of the road after the curve. However, the ACC vehicle remains in the curve and continues to travel along the curve. This case is similar to Case B described above. The similarity between Case B and Case D will also be further described below.

Figure 5:
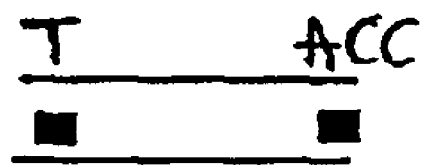
FIG. 5 is a plan view of the ACC vehicle and the target vehicle, showing both vehicles traveling along the straight portion after the curve.

Turning now to FIG. 5, Case E is shown. In Case E, the ACC vehicle has exited the curve. Thus, both vehicles are traveling along the straight portion of the road after the curve. Therefore, the travel direction of both vehicles is the same. Case E is similar to Case A described above.

Figure 6:
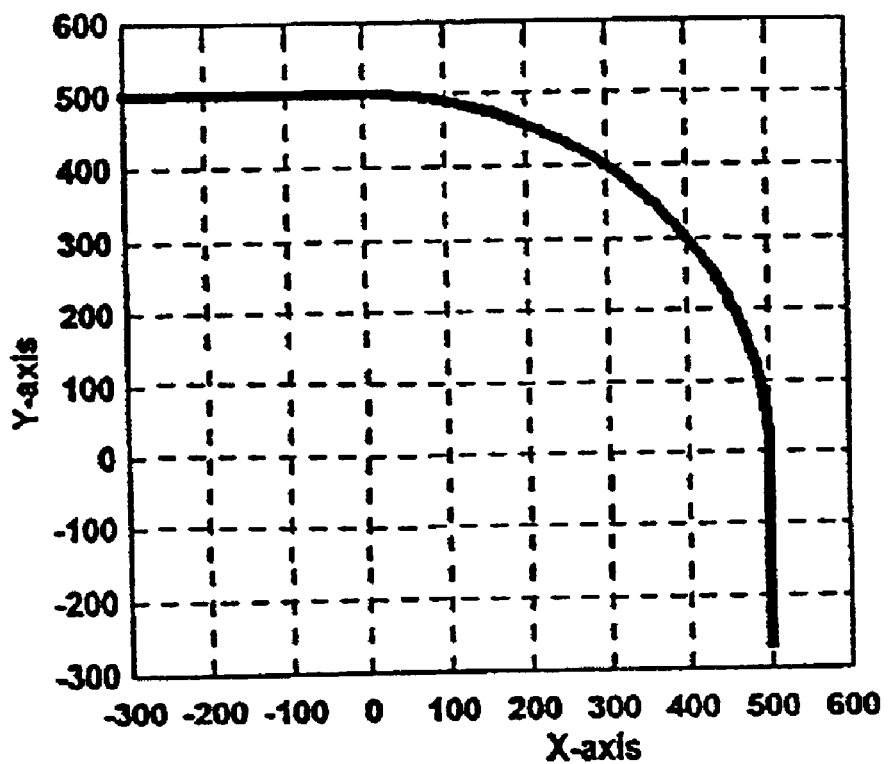
FIG. 6 is a trace of the curve from FIGS. 1–5 along an X-axis and a Y-axis.
Figure 7:
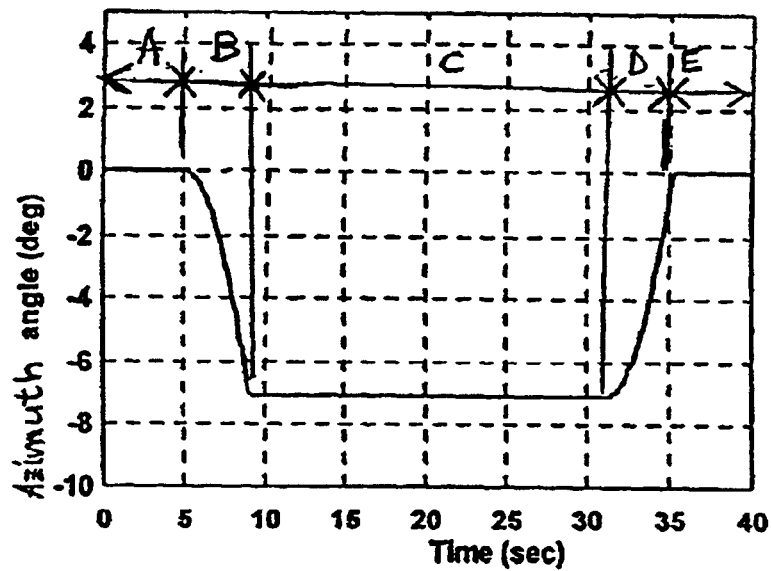
FIG. 7 is a chart of the vehicle example from FIGS. 1–5, showing azimuth angle versus time.
Figure 8:
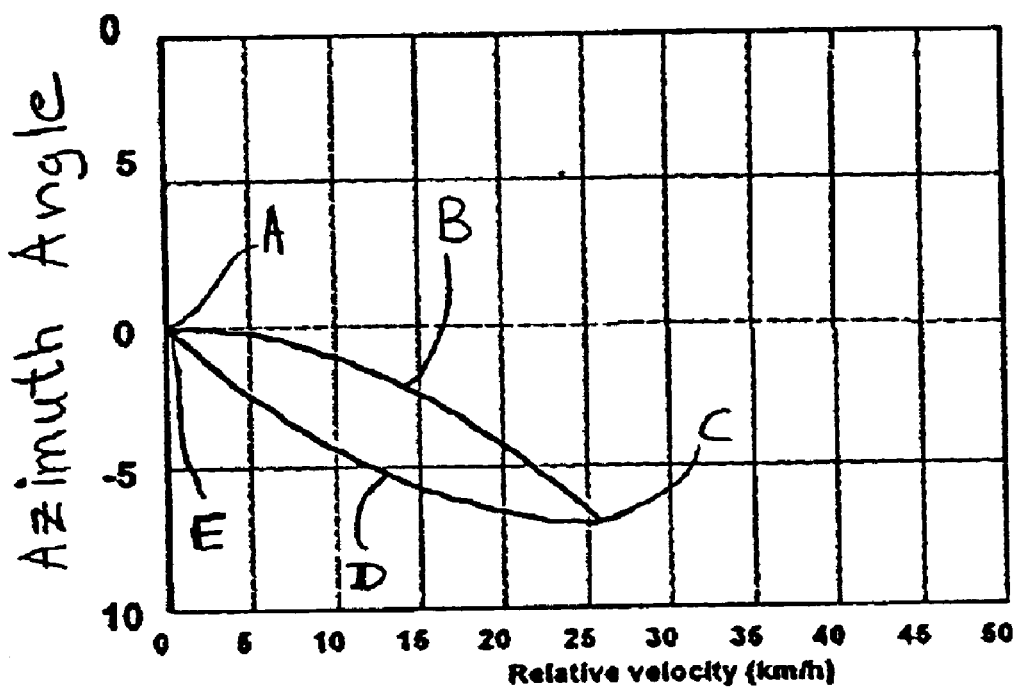
FIG. 8 is a phase chart of the vehicle example from FIGS. 1–5, showing azimuth angle versus relative velocity.

Turning now to FIGS. 6–8, a trace of the curve is shown in FIG. 6. The trace is drawn on an X-axis and a Y-axis and is generally representative of the curve in FIGS. 1–5. In FIG. 7, the change in azimuth angle is shown as the target vehicle and the ACC vehicle travel along the curve. The five cases described above are denoted on the chart. Accordingly, Case A is represented between 0 and about 5 seconds. The azimuth angle remains 0° throughout this case because both vehicles are traveling straight in the same direction. Case B is represented between about 5 and 9 seconds. In this case, the azimuth angle decreases sharply from 0° to about 7°. The azimuth angle is steadily changing throughout this case because the ACC vehicle is still traveling along the straight portion of the road. However, the target vehicle is traveling along the curve and is steadily changing its direction of travel. Case C is represented between about 9 seconds and about 31.5 seconds. The azimuth angle remains about 7° throughout this case because both vehicles are traveling along the constant curve. Thus, the target vehicle is maintaining a constant difference in travel direction from the ACC vehicle. Case D is represented between about 31.5 seconds and 35.5 seconds. In this case, the azimuth angle increases sharply from about 7° to 0°. Like Case B, the azimuth angle steadily changes throughout this case because the target vehicle is traveling along a straight portion of the road but the ACC vehicle is traveling along the curve. Case E is represented between about 35.5 seconds to 40 seconds. Like Case A, the azimuth angle remains 0° throughout this case because both vehicles are traveling straight again in the same direction. Other times and azimuth angles may result from different speeds, curves and distances between vehicles.

FIG. 8 shows a phase chart for each of the five cases. In the chart, Case A is a single point at the origin. As previously described, the azimuth angle remains at 0° throughout this case, and the relative velocity also remains at 0 km/h. Case B is a downward sloping curve that begins at the origin. During this case, the azimuth angle changes from 0° to about 7°, and the relative velocity increases from 0 km/h to about 26 km/h. Case C is a single point between the curves marked B and D. As previously described, the azimuth angle and the relative velocity remain constant during this case. Case D is an upward sloping curve that begins at Case D and ends at the origin. Case D is generally an inverse of Case B, with the azimuth angle changing from about 7° to 0° and the relative velocity decreasing from about 26 km/h to 0 km/h. Case E is a single point at the origin like Case A.

A phase chart like that shown in FIG. 8 may be determined for many kinds of curves. A constant radius curve has been used herein to simplify the description. However, a changing radius curve would produce a similar phase chart. In a changing radius curve, Case C may be a curve instead of a single point, but the general characteristics of the phase chart may be similar to that described above. Moreover, although a left-hand curve has been described, a right-hand curve produces similar results. Multiple linked curves may also be analyzed using the techniques described herein.

Figure 9:
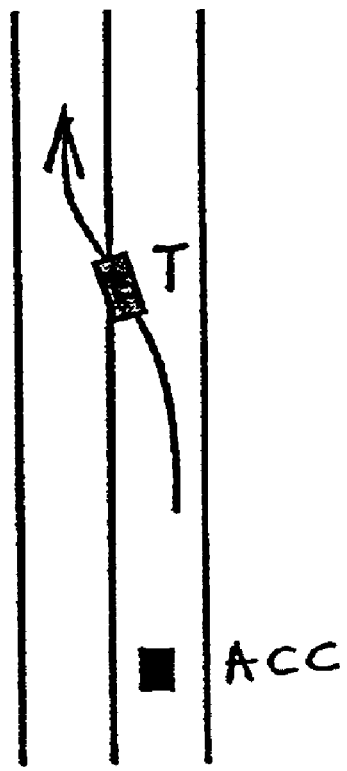
FIG. 9 is a plan view of a target vehicle changing lanes away from an ACC vehicle.

Turning now to FIG. 9, an example of a lane change is shown. In this example, both the target vehicle and the ACC vehicle are traveling at 108 km/h like the previous curve example. Initially both vehicles are traveling in the same, right-hand lane. The target vehicle then changes lanes from the right-hand lane to the left-hand lane.

Figure 10:
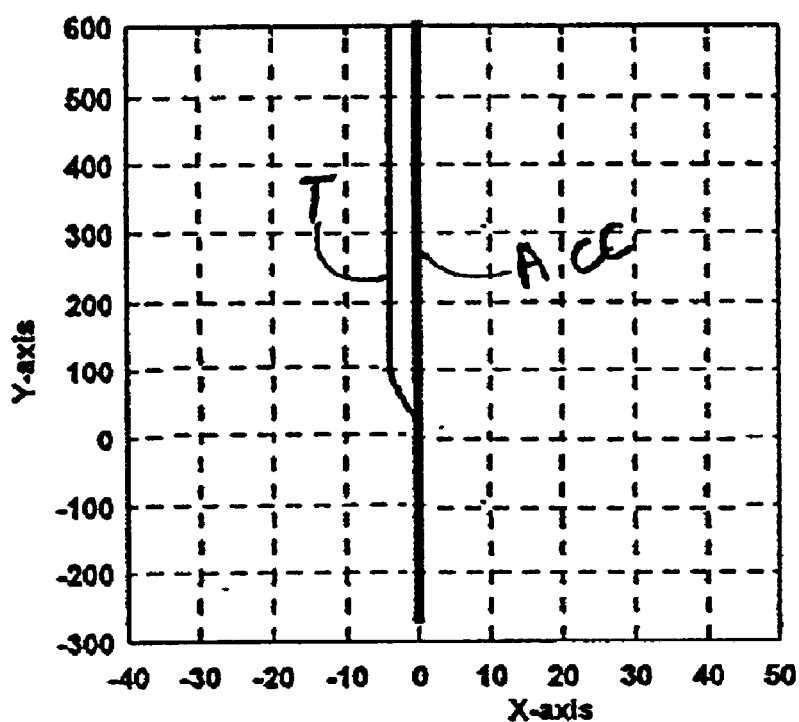
FIG. 10 is a trace of the lane change from FIG. 9 along an X-axis and a Y-axis.

A trace of the lane change example is shown in FIG. 10 along an X-axis and a Y-axis. The travel path of the target vehicle shifts to the left about 4 m after the lane change. However, the travel path of the ACC vehicle does not change and remains straight.

Figure 11:
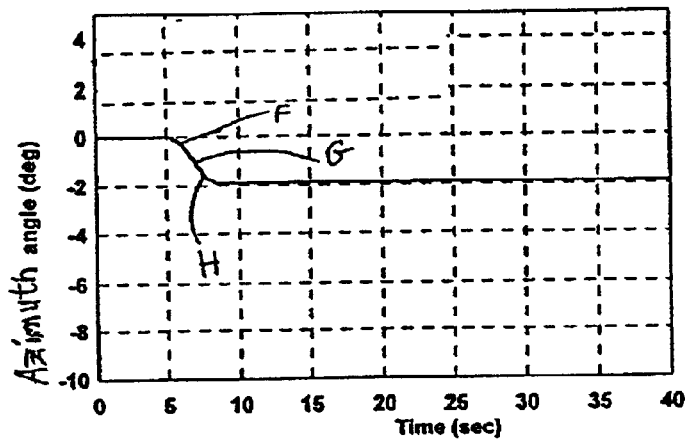
FIG. 11 is a chart of the vehicle example from FIG. 9, showing azimuth angle versus time.

FIG. 11 shows the change in azimuth angle during the lane change. Initially, from 0 to about 5 seconds, both the target vehicle and the ACC vehicle are in the same lane. During this time, the azimuth angle remains 0°. The lane change then occurs between about 5 to about 8.5 seconds. The lane change is denoted with three segments F, G, H. Segment F shows a concave down portion of the change in azimuth angle. Segment G shows an inflection point between segments F and H. Segment H shows a concave up portion of the change in azimuth angle. After the lane change, the azimuth angle now remains constant at about 2°.

Figure 12:
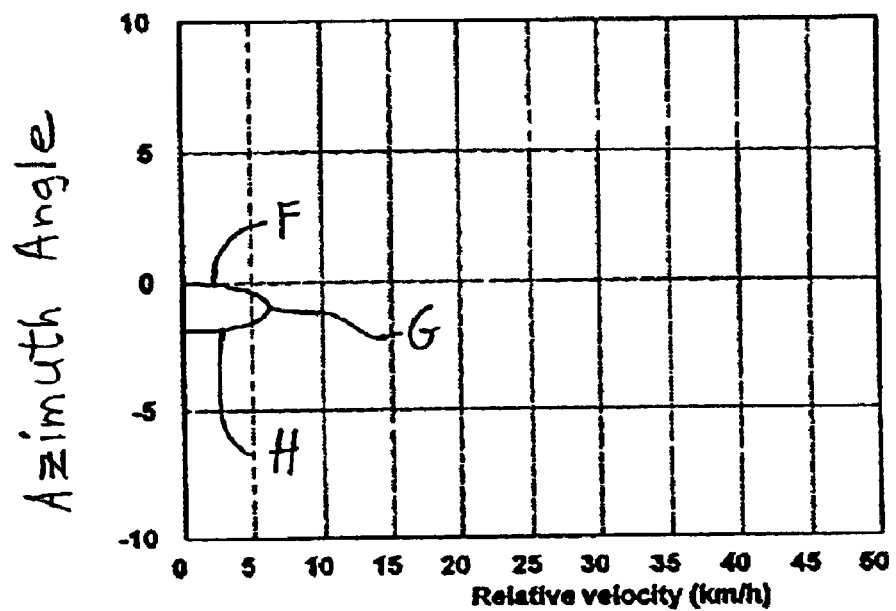
FIG. 12 is a phase chart of the vehicle example from FIG. 9, showing azimuth angle versus relative velocity.

FIG. 12 shows a phase chart of the lane change. During segment F, the azimuth angle decreases, and the relative velocity increases. Segment G is an intersection point between segments F and H. During segment H, the azimuth angle continues to decrease, but the relative velocity also decreases in contrast to segment F.

Figure 13:
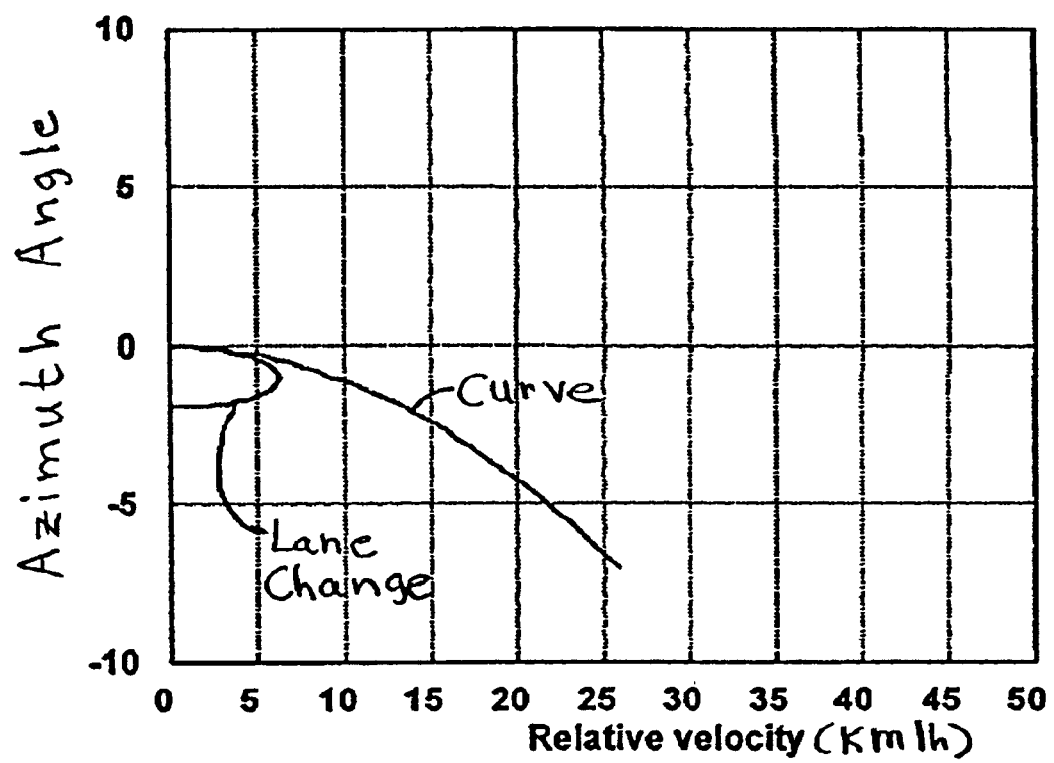
FIG. 13 is a combined phase chart of the phase charts from FIGS. 8 and 12.

FIG. 13 shows the phase chart of the curve example and the phase chart of the lane change example on a single chart. Only Case B of the curve example is shown on this chart. From the comparison of the two phase charts, the characteristics of the two examples change after about 1°. Accordingly, in the example of the lane change, the relative velocity begins to decrease after the azimuth angle has changed by about 1°. In contrast, the relative velocity in the curve example continues to increase even after the azimuth angle has changed by 1°.

Figure 14:
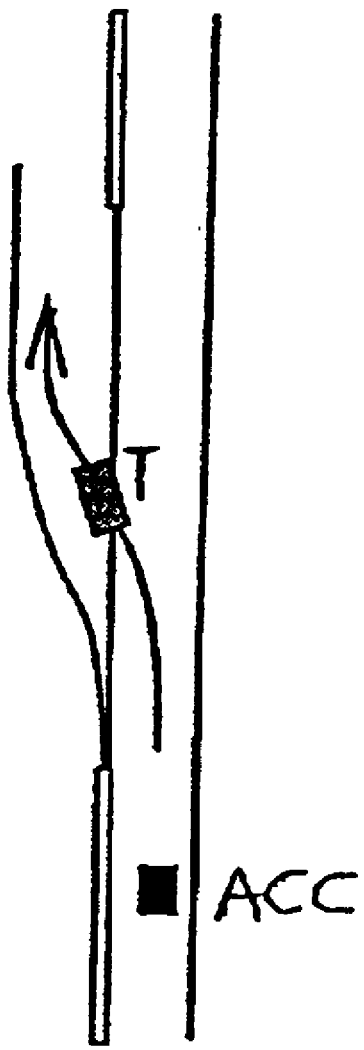
FIG. 14 is a plan view of a target vehicle exiting a road and an ACC vehicle staying on the road.

Turning now to FIGS. 14–17, another lane change example is shown. In FIG. 14, the target vehicle is exiting from the road onto an exit ramp. In this example, both vehicles are initially traveling at a speed of 108 km/h like the previous examples. However, in this example, the target vehicle slows about 20% before changing directions to exit.

Figure 15:
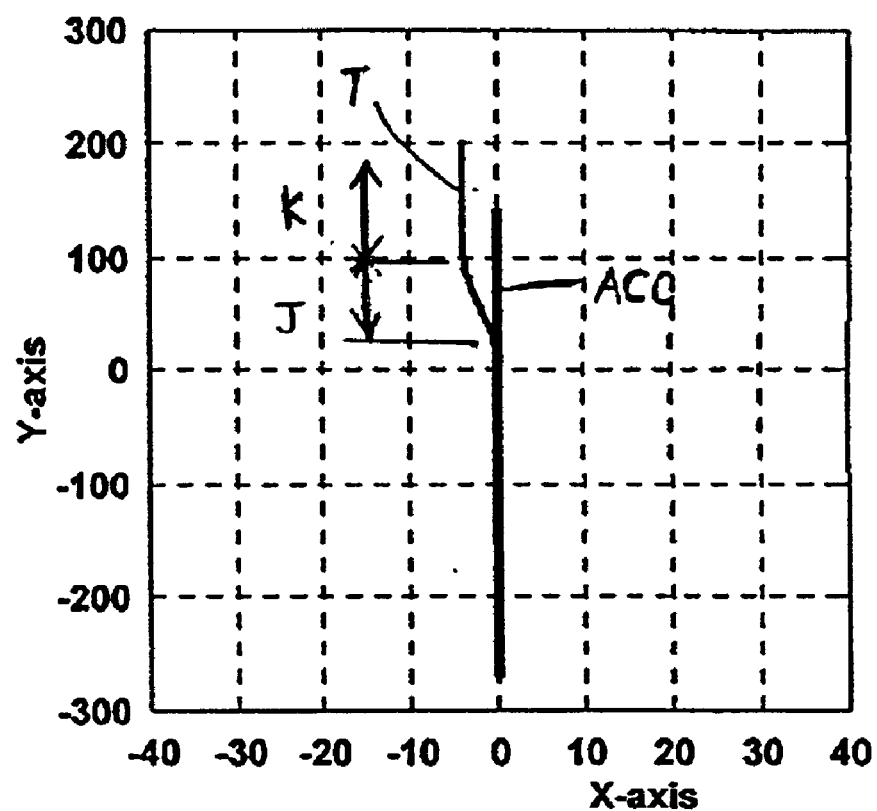
FIG. 15 is a trace of the exit from FIG. 14 along an X-axis and a Y-axis.
Figure 16:
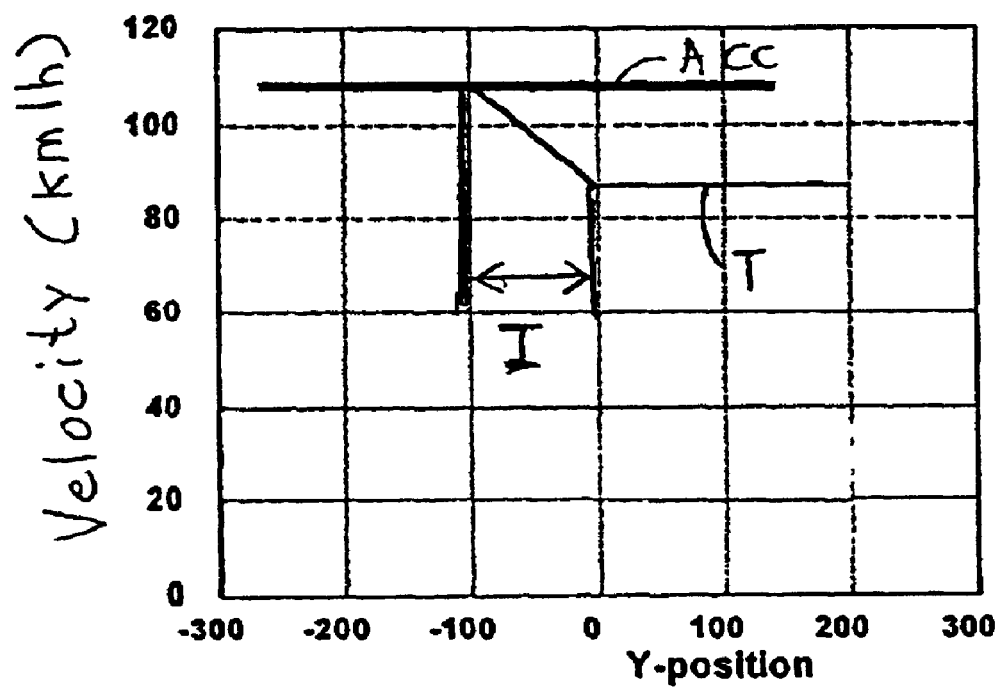
FIG. 16 is a trace of the vehicle example from FIG. 14 along the Y-axis versus velocity.

FIG. 15 shows a trace of the travel paths of the two vehicles along an X-axis and a Y-axis. Initially, the target vehicle and the ACC vehicle travel in the same lane and in the same direction. The target vehicle then shifts left as it exists, while the ACC vehicle stays in the right lane and continues traveling straight. The portion where the target vehicle is exiting is denoted as Segment J, and the remaining portion where the target vehicle is traveling straight again on the exit ramp is denoted Segment K. FIG. 16 shows another trace of the two vehicles along the Y-axis versus velocity. The velocity of the target vehicle is shown decreasing from 108 km/h to about 87 km/h. This decrease in velocity is denoted Segment I. After the target vehicle slows to about 87 km/h, the target vehicle maintains a constant velocity of about 87 km/h, and the ACC vehicle maintains a faster velocity of 108 km/h. In this example, the target vehicle slows before changing direction (i.e., Segment I occurs before Segments J and K), but it should be recognized that other variations are also possible.

Figure 17:
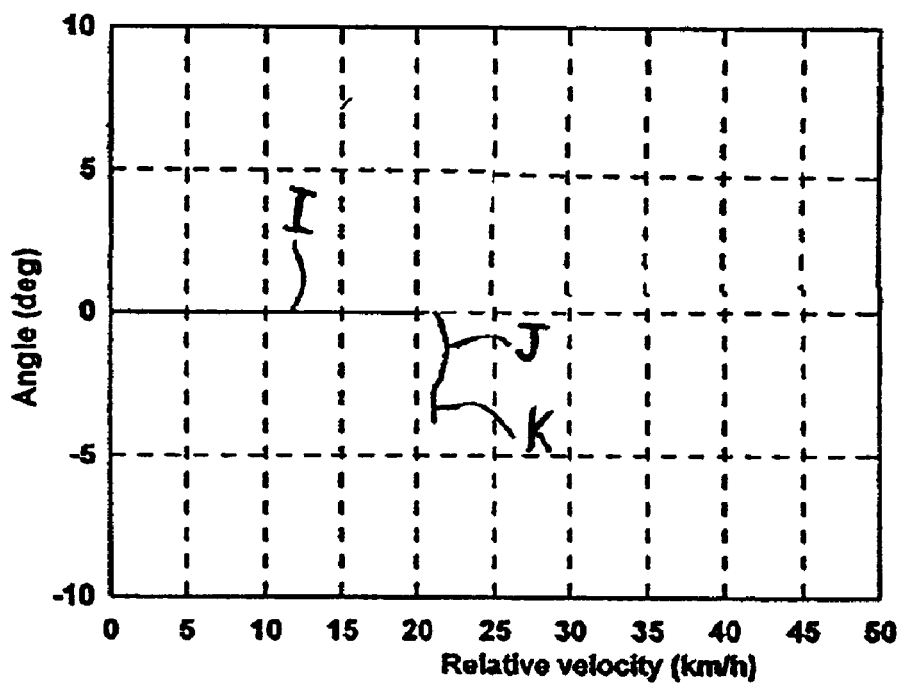
FIG. 17 is a phase chart of the vehicle example from FIG. 14, showing azimuth angle versus relative velocity.

FIG. 17 shows a phase chart of the exit example. During Segment I, the relative velocity increases from 0 km/h to about 21 km/h, but the azimuth angle remains constant at 0°. This reflects the velocity reduction prior to the direction change while both vehicles are still in the same lane. During Segment J, the relative velocity increases slowly to about 23 km/h as the azimuth angle decreases to about 1.5°. The relative velocity then decreases back to about 21 km/h as the azimuth angle continues to decrease to about 3°. During Segment K, the relative velocity remains constant at about 21 km/h, and the azimuth angle continues to decrease.

Figure 18:
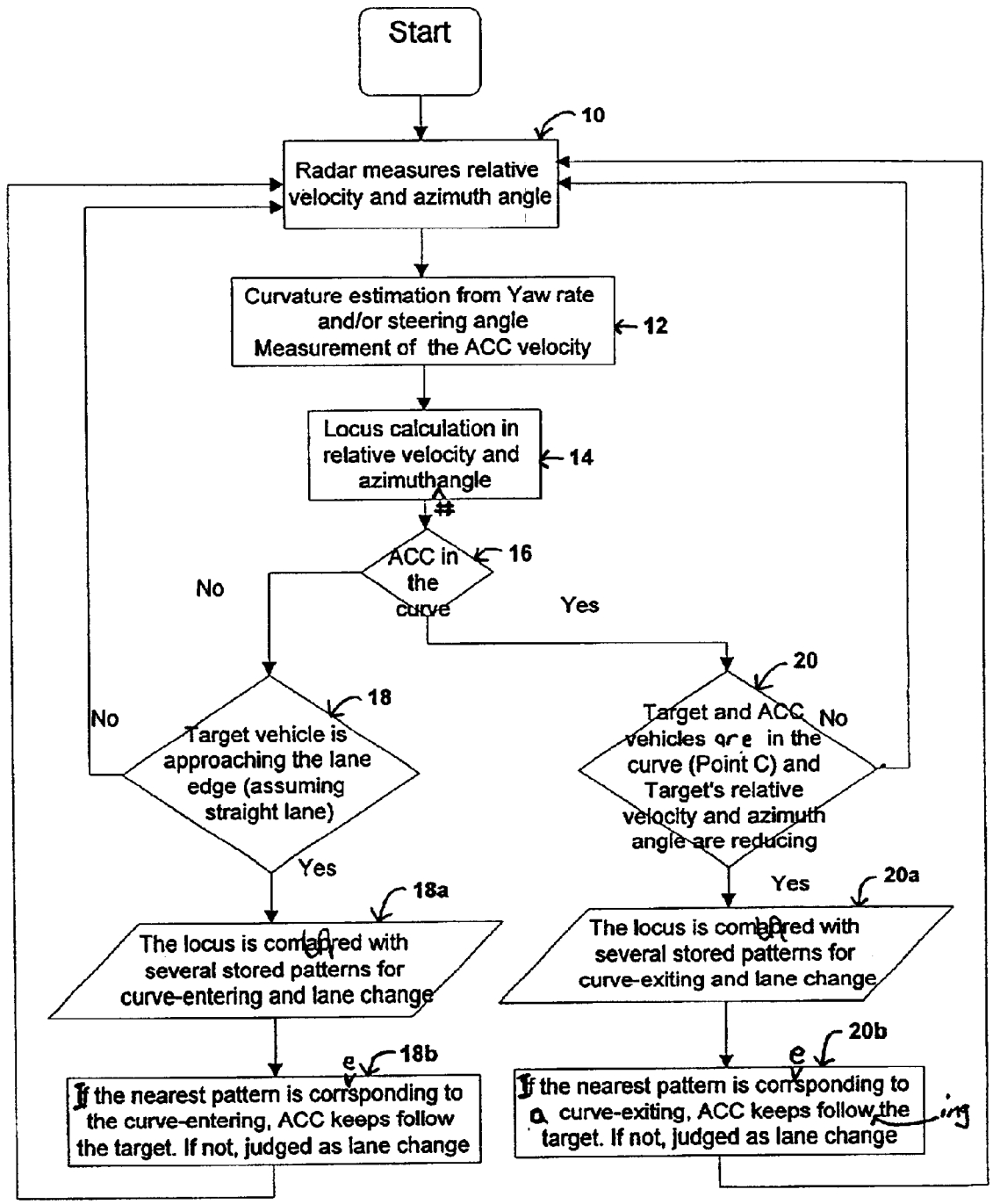
FIG. 18 is a flow chart of one embodiment showing a test for deciding whether a target vehicle is traveling along a curve or whether the target vehicle is changing lanes.

Turning now to FIG. 18, a flow chart is shown for testing whether a target vehicle is traveling along a curve or whether the target vehicle is changing lanes or exiting. First, the relative velocity and azimuth angle between the ACC vehicle and the target vehicle is measured 10. Other relative positional data may also be computed and used to define the changing spatial relationship between the target vehicle and the ACC vehicle. Next, the velocity of the ACC vehicle, called the ACC velocity, is measured, and the lane curvature of the ACC vehicle is estimated from the Yaw rate and/or steering angle. A locus is then calculated using the relative velocity and azimuth angle 14.

The ACC then tests whether the ACC vehicle is traveling along a curve based on the time average of the estimated curvature 16. If the ACC vehicle is judged to be on a straight line, the ACC tests whether the target vehicle is approaching the edge of the lane 18. If the target vehicle is judged to be approaching the lane edge, the locus is compared with stored patterns for curve entering and lane changing possibilities 18a. If the nearest pattern corresponds to curve entering, the ACC continues tracking the target vehicle 18b. On the other hand, if the nearest pattern corresponds to lane changing, the ACC stops tracking the target vehicle 18b. Preferably the test is performed after the azimuth angle becomes greater than 1.5°, since this makes the change in the locus more evident between curve entering and lane changing possibilities. Furthermore, when the discrepancy between the measured locus and the pattern for curve entering is similar to the discrepancy between the measured locus and lane changing, the ACC preferably judges that the target vehicle is traveling along a curve.

When the ACC vehicle and target vehicle are both traveling along a curve, a test is performed to determine when the relative velocity and azimuth angle begin to decrease 20. The locus is then compared with stored patterns for curve exiting and lane changing possibilities 20a. If the nearest pattern corresponds to the curve exiting, the ACC continues tracking the target vehicle 20b. On the hand, if the nearest pattern corresponds to lane changing, the ACC stops tracking the target vehicle 20b.

In FIG. 18, the operation of the ACC for stationary conditions, in which the target vehicle and ACC vehicle are both traveling in a straight lane or along the same curve, is omitted since conventional ACC operations may be used for these conditions. Also, when measuring the velocity of the ACC vehicle, the Yaw rate and/or steering angle may be used since the relative velocity change and azimuth angle change is derived from the velocity of the ACC vehicle.

Figure 19:
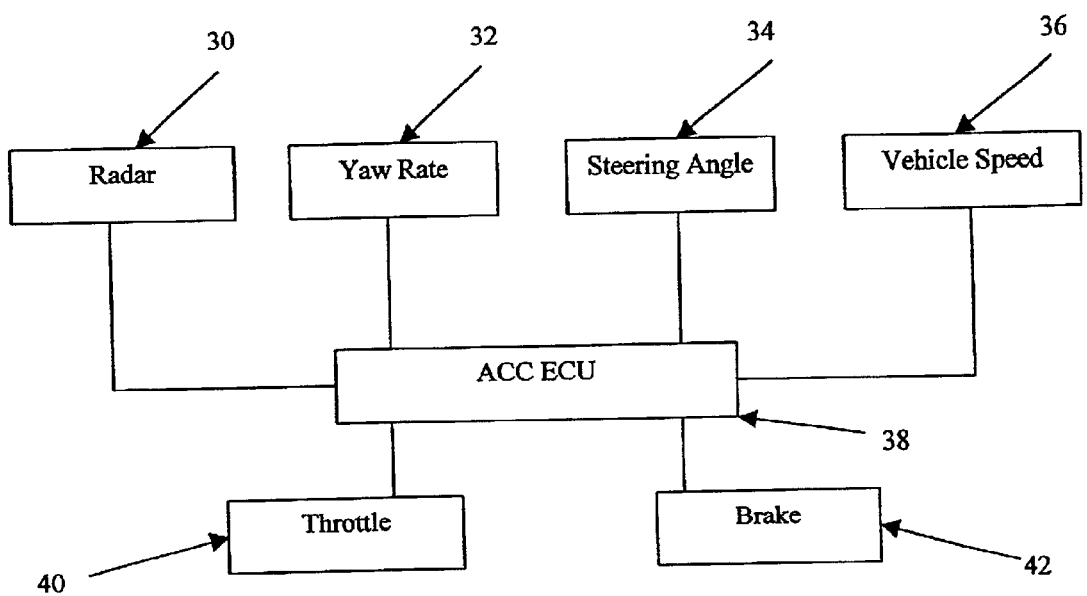
FIG. 19 is a block diagram of one embodiment of an ACC system.

Turning now to FIG. 19, an ACC electronic control unit ("ECU") 38 is shown. The ECU 38 tracks a target vehicle through a curve. The ACC ECU 38 receives inputs from a number of vehicle sensors including a radar sensor 30, a yaw rate sensor 32, a steering angle sensor 34 and a vehicle speed sensor 36. The ACC ECU 38 uses data obtained from these sensors to control the vehicle's speed by adjusting the throttle 40 or the brake 42. The ACC ECU 38 maintains a substantially constant distance between a target vehicle and the ACC vehicle through a curve by monitoring an increasing change between the travel direction of the target vehicle and the travel direction of the ACC vehicle or by monitoring the azimuth angle and relative velocity between the target and ACC vehicles. After a test interval of about 1.5°, the ACC ECU 38 determines that the target vehicle is changing lanes if the change in direction between the two vehicles begins to decrease. Typically, the radar measurement is made every 0.1 second. Therefore, judgment based on the locus should be started every 0.1 second after the azimuth angle becomes larger than 1.5° for the possibilities of entering a curve or changing a lane. After determining that the target vehicle is changing lanes, the ACC vehicle changes from ACC mode to CC mode.

In FIG. 18, the judgment is made on the basis of a pattern comparison. However, as a simple judgment, the locus between relative velocity and azimuth angle starts to return toward the original point. Thus, the target is determined to be changing lanes. In this judgment, the ACC vehicle starts the judgment at 1.5° of the azimuth angle and continues the judgment every 0.1° until 3.5° for curve entering or lane changing. For example, when headway between the vehicles is 40 m and lateral displacement is 2 m, the azimuth angle is about 3°. Therefore, the azimuth angle should be monitored for at least 3°. However, the judgment will usually be made before 3°. This test can be achieved by monitoring the slope of the azimuth angle, i.e., $d\theta/dV_R$, where $\theta$ and $V_R$ are azimuth angle and relative velocity of the target vehicle, respectively.

If a lane change is detected, the ACC ECU 38 disengages the ACC and adjusts the speed of the ACC vehicle to a preset speed. On the other hand, if a curve is detected, the ACC ECU 38 keeps the ACC engaged and adjusts the speed of the ACC vehicle to match the speed of the target vehicle. Other test intervals may also be used, such as between 1° and 2° or between 1.3° and 1.8°. In one embodiment, the ACC ECU 38 monitors a change in azimuth angle between the ACC vehicle and the target vehicle. In another embodiment, the ACC ECU 38 additionally or alternatively monitors relative velocity between the vehicles. In still another embodiment, the ACC ECU 38 constructs a phase chart from both the azimuth angle and the relative velocity. The ACC ECU 38 monitors the phase chart both when the target vehicle enters and exits the curve and also when both vehicles are traveling along the curve, thus improving tracking of the target vehicle.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein.

I claim:

1. An adaptive cruise control system comprising a sensor determining a travel direction of a first vehicle and a travel direction of a second vehicle; an electronic control unit operable to receive said determinations from said sensor and monitor an increasing change between said first vehicle travel direction and said second vehicle travel direction; wherein said electronic control unit controls a speed of said first vehicle as a function of said monitoring; and wherein said electronic control unit determines whether said change in travel directions continues to increase or begins to decrease after a test interval; wherein said electronic control unit determines whether said second vehicle is traveling along a curve or is changing a lane, said curve travel decision occurring when a segment of said change in travel directions continues to increase after a test interval, said lane change decision occurring when said segment decreases after said test interval, wherein said electronic control unit adjusts a throttle to maintain a constant distance between said first and second vehicles when said curve travel decision occurs and said electronic control unit adjusts said throttle to maintain a preset speed when said lane change decision occurs.

2. The adaptive cruise control system according to claim 1, wherein said electronic control unit tests said determination repetitively for overlapping test intervals.

3. The adaptive cruise control system according to claim 1, wherein said electronic control unit tests said determination for a single test interval when said change in travel direction begins to increase.

4. The adaptive cruise control system according to claim 1, wherein said change in travel direction is a relative velocity.

5. The adaptive cruise control system according to claim 4, wherein said test interval is an azimuth angle.

6. The adaptive cruise control system according to claim 5, wherein said test interval is about 1.5°.

7. The adaptive cruise control system according to claim 5, wherein said test interval is between 1° and 2°.

8. The adaptive cruise control system according to claim 7, wherein said electronic control unit tests said determination repetitively for overlapping test intervals.

9. The adaptive cruise control system according to claim 7, wherein said electronic control unit tests said determination for a single test interval when said change in travel direction begins to increase.

10. The adaptive cruise control system according to claim 5, wherein said test interval is between 1.3° and 1.8°.

11. A method for tracking a target vehicle through a curve comprising determining a travel direction of a tracking vehicle; determining a travel direction of a target vehicle; calculating a change in said travel directions; testing said change in travel directions increases or decreases during a test interval, said test interval being an azimuth angle between 1° and 2°; and adjusting the speed of said tracking vehicle based on said testing, wherein said change in travel directions is a relative velocity, wherein said testing decides said target vehicle is traveling along a curve when said relative velocity is increasing after said azimuth angle test interval, wherein said testing decides said target vehicle is changing lanes when said relative velocity is decreasing after said azimuth angle test interval.

12. An adaptive cruise control system, comprising:

a sensor measuring a distance, relative velocity and azimuth angle of a preceding vehicle for an ACC vehicle;

instruments measuring the Yaw rate and/or steering angle and velocity of the ACC vehicle;

an electronic control unit receiving said measurements from said sensor and said measurements from said instruments, calculating a locus (phase chart) between the relative velocity and azimuth angle of said preceding vehicle, having already calculated the locus, comparing said locus with stored loci, selecting a most suitable locus among said stored loci, and controlling a throttle and/or transmission; and said throttle and/or transmission being responsive to said electronic control unit, wherein said electronic control unit adjusts said throttle and/or transmission based on said selection.

13. The adaptive cruise control system according to claim 12, wherein said electronic control unit has stored loci corresponding to several lane changes, said preceding vehicle with various distances entering a curve with various curvature, said ACC vehicle and said preceding vehicle with various distances traveling in a curve with various curvature, and said preceding vehicle with various distances exiting a curve with various curvature; said electronic control unit judging whether the preceding vehicle is entering a curve, changing a lane, traveling in the same curve with the ACC vehicle, or exiting a curve.

14. The adaptive cruise control system according to claim 13, wherein said sensor, instruments, said electronic control unit and throttle and/or transmission operate faster than 0.1 second.

15. The adaptive cruise control system according to claim 13, wherein said electronic control unit starts said selection after said azimuth angle becomes larger than 1.5 degrees, where the azimuth angle begins from almost zero.

16. The adaptive cruise control system according to claim 13, wherein said locus is recalculated after a change of the ACC vehicle's velocity.

17. An adaptive cruise control system, comprising:

a sensor measuring a distance, relative velocity and azimuth angle of a preceding vehicle for an ACC vehicle;

instruments measuring the Yaw rate and/or steering and velocity of the ACC vehicle;

an electronic control unit receiving said measurements from said sensor and said measurements from said instruments, calculating a ratio between the relative velocity and azimuth angle of said preceding vehicle, comparing said ratio with thresholds, and controlling a throttle and/or transmission; and said throttle and/or transmission being responsive to said electronic control unit, wherein said electronic control unit adjusts said throttle based on said comparison.

18. The adaptive cruise control system according to claim 17, wherein said thresholds correspond to driving straight and in curves of various curvature.

19. The adaptive cruise control system according to claim 17, wherein said sensor, instruments, said electronic control unit and throttle and/or transmission operable faster than 0.1 second.

20. The adaptive cruise control system according to claim 17, wherein said electronic control unit starts said comparison after said azimuth angle becomes larger than 1.5 degrees, where the azimuth angle begins from almost zero.

21. The adaptive cruise control system according to claim 17, wherein said electronic control unit makes said comparison on the basis of an average of angle change greater than 0.2 degrees.

22. The adaptive cruise control system according to claim 17, wherein said locus is recalculated after the change of the ACC vehicle's velocity.

* * * * *